May 16, 1939.   G. D. WEBBER   2,158,555
MEASURING INSTRUMENT
Filed Sept. 16, 1937

INVENTOR.
GEORGE D. WEBBER
BY Bates, Goldrick, & Tear
ATTORNEYS

Patented May 16, 1939

2,158,555

UNITED STATES PATENT OFFICE 2,158,555

MEASURING INSTRUMENT

George D. Webber, Cleveland, Ohio, assignor to Webber Metric Gage Company, Cleveland, Ohio, a corporation of Ohio Application September 16, 1937, Serial No. 164,171

3 Claims. (Cl. 33—147)

This invention relates to a measuring instrument; and the embodiment shown is of the type known as a comparator. The novel principles are applicable to other instruments for obtaining accurate and delicate measurements of objects. The general object is to provide an improved measuring instrument.

A further object is to provide an indicator movement which will not be subject to errors irrespective of the position in which used.

Another object is to provide an improvement in the construction of V notches for a measuring beam adapted to contact with a knife edge, and specifically to provide such V notch as may be accurately and easily ground without any fillet or other undesirable shape at the apex of the V.

Another object is to provide a comparator which is less subject to error in the event of measuring heavy objects than are prior instruments of its class.

Further novel features and advantages of the invention will become apparent from the following description relating to the accompanying drawing. The essential characteristics are summarized in the claims.

Figure 1:
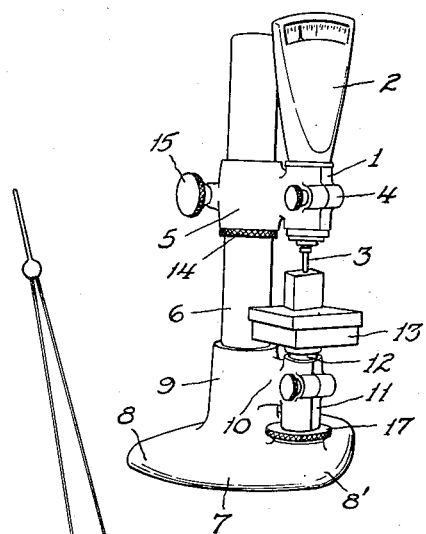
Figure 2:
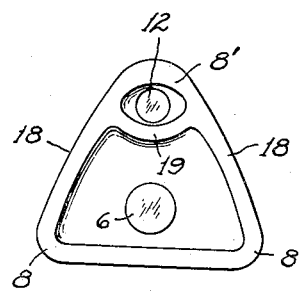
Figure 5:
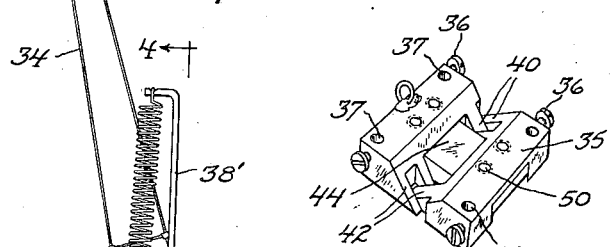
Figure 3:
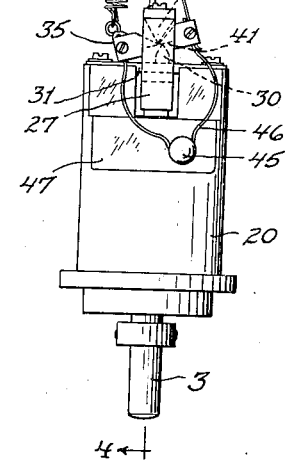
Figure 4:
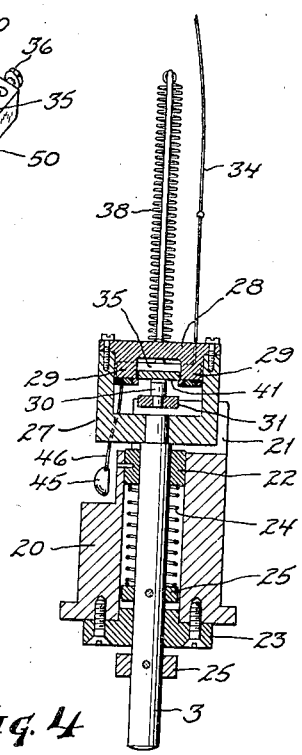

In the drawing, Fig. 1 is a perspective view of a comparator embodying the invention; Fig. 2 is a bottom plan view of the base or pedestal for the instrument; Fig. 3 is a front elevation of the measuring head; Fig. 4 is a central vertical sectional view thereof, taken at right angles to Fig. 3, and Fig. 5 is a perspective view of a measuring beam embodying the preferred V notch construction mentioned above.

Referring further to the drawing (Figs. 1 and 2), the measuring mechanism includes, as shown, a head 1 having an upstanding dial housing 2 exposing a suitable scale, and a depending feeler or plunger 3 (for contact with the work), and which is movable vertically with reference to the head in effecting a measuring or comparing operation. The head may be of any other form, adapting the instrument to be used independently of the supporting arrangement shown; for instance, as are conventional dial-gauges.

The head, as illustrated, is part of an arm 5 adjustably carried on a rigid circular post 6 rising from a base 7 which is adapted to support the mechanism upright on a bench or table. The base 7 may conveniently be made as a relatively heavy metal casting, with three leg portions 8 (front leg designated 8'), intermediately of which legs is a hollow boss 9 machined to support the post 6.

At one side of the boss 9 is an arm 10 having a split vertical tubular end which is in line with the leg portion 8' of the base casting and carries a stem 12 for a work table 13, rigid with the stem.

Coarse adjustment between the feeler and the table or work thereon is effected by movement of the arm 5 on the post 6, as by a ring 14 having a pin engaging a coarse spiral groove (not shown) in the post; the adjustment being subject to locking, as by a clamp having an operating part 15. Fine or micrometric adjustment can be effected by a ring 17 fitting closely between smoothly finished surfaces on the tubular portion 11 of the arm and the top face of the base over the leg 8', the ring having fine internal threads engaging those of the stem 12 of the work table. A feature of the invention is the relationship of the work supporting parts to the leg effect, it being observed that a weight on the center of the table 13 will not deflect any part of the base casting and cause inaccurate readings of the instrument when set (e. g.) to a gage block having no appreciable weight. A bottom flange 18 extends downwardly about the base casting as the actual rest surface of the base, and this, as shown, in Fig. 2, passes sufficiently close to the region of the work table mounting so that no part of the casting can bend under a very heavy weight. Optionally, a rib 19 may subtend the flanges 18 at the leg 8' on the far side of the axis of the stem 12 and flush with the flanges 18 for engagement with the bench, etc.

The measuring unit, exclusive of the supporting head, is entirely shown in Figs. 3 to 5. A main body or barrel 20 slidably carries the feeler-plunger 3, centrally of it in an appropriate bore. The barrel may be fixed to the head 1 by a clamp 4. The guides for the plunger are shown as top and bottom bushings 22 and 23, in such central bore, each fastened to the barrel. The force of the feeler, as applied to the work, is constant, being governed by a spring 24 reacting upwardly against the bushing 22 and downwardly against a collar 25 fast on the plunger. Excessive upward movement of the plunger may be limited by a stop collar 26 adapted to engage the lower bushing.

The top end of the feeler-plunger is shouldered to support a yoke 27, movable freely in a cross recess cut into the top of the barrel; and the arms of the yoke (see Fig. 4) have fastened thereto a cross bar 28 with depending spaced knife edges 29, the working plane of which preferably lies on the axis of the plunger. A fixed upstanding knife edge 30, offset slightly with respect to the plane of the knife edges 29, is supported as by a bar 31 extending across the barrel and fastened thereto, and the knife edges support and cooperate in positioning the measuring beam 35 illustrated best in Fig. 5.

The yoke and plunger may be prevented from rotating by set screws (not shown) adapted to enter opposite sides of the cross slot in the body or barrel 20 opposite the side viewed in Fig. 3. Such screws are set only slightly wider apart than the adjacent upstanding arm of the yoke.

The beam 35 carries an indicator arm 34, which is very light in weight, being made, preferably, principally of wire as an A frame, with its legs clamped, as by screws 36, in holes 37 of the beam. The upper end of the arm cooperating with the scale as usual, and may terminate at one, two or three points, as desired; one only being shown.

The beam 35 has, in a sense, a floating support, being held in position only by the knife edges and a light tension spring 38 (exerting say 1/60 ounce pressure) acting upwardly on the left-hand end of the beam, as shown in Fig. 3. This spring may have its upper end anchored to a post 38' on the member 28; and due to its small force it will not inject measurable error into the measurement or comparison in view of the greatly superior strength of the feeler spring 24, (usually 10 ounce or standard pressure). The fixed knife edge bears against a flat surface 41 on the bottom of the beam, and the edges 29 bear downwardly in V notches 40 of the beam at each side of the flat surface. Preferably, as an ideal condition, the apices of the V notches are in the plane of said surfaces 41.

As will be seen from Fig. 3, the beam 35 is lifted by the light spring 38 when the feeler plunger moves toward it, but is never pushed by the plunger. Hence, there can be no disturbing deflection on the beam, the force of spring 38 being constant. The spring 38 takes up any slight wear that may occur between the knife edges and cooperating surfaces after years of service.

The above measuring principles, aside from constructional features, are well known. Heretofore, however, (prior to present invention) the V notch or notches, so far as I know, were made in a one-piece block, which usually carried also the flat surface, such as 41. It was impossible to cut a perfect V notch i. e. without a fillet or some inaccuracy at the apex.

I have obtained a true V notch by making the principal portion of the beam in two parts or sections with overlapping V arm portions 42, as shown in Fig. 5. These are held in fixed position by a cross bar 44, seated in complementary aligned channels in the bottom side of the beam sections, being clamped accurately in position by screws 50 entering from the bottom, so that all parts of the beam are mutually rigid, and the axes of each V notch are held normal to the flat surface 41, which is afforded by the bottom side of the connecting bar.

In the construction shown, the ends of the beam 35 serve as stops for the indicator arm. Slight upward movement of the feeler-plunger 3 is permitted beyond such as will bring the right hand end of the beam to stopping position, as by engaging the top of the barrel 20. This is useful in placement of work in slightly tilted position or work that may be oversize beyond the reading limits of the dial.

A further feature of the invention is the provision of a counter-weight for the indicator arm, whereby the instrument will operate in any position; as when disposed horizontally and so that a vertical plane cuts both arms of the indicator 34. In such case, even the light weight of the indicator arm would be a disturbing factor. The counter-weight is preferably a small chunk of metal 45 on a bail-like support 46, as of very light wire, the ends being fastened in the set of holes 37 of the beam opposite those occupied by the legs of the indicator arm. The barrel 20 may be cut away as at 47 to clear the counter-weight and allow the entire barrel to be housed in a cylindrical bore of any appropriate mounting or support. The lower tubular end of the dial housing fits over the top of the barrel and the assembly (housing and barrel mechanism) is sealed up after initial adjustment of the instrument, so as to avoid tampering or attempted adjustment by unauthorized persons.

I claim:

1. A measuring beam for an instrument of the class described comprising a central plate, and a pair of separate members which are channeled to straddle the plate, mounted on opposite end portions and on the same side of the plate, each having a diagonally surfaced tongue at one side of the plate and a pair of diagonally surfaced tongues at the other, so arranged that a tongue extends between a pair of tongues at the two sides of the plate to form a true V notch at each side for receiving knife edges.

2. In an instrument for measuring distances, and wherein knife edge members bear respectively against opposite sides of a beam, one centrally of the beam and the other in straddling relationship to the central region; the construction of beam comprising a flat plate, one main surface of which is adapted for engagement by the central knife edge member, two separate members secured adjacent the opposite main surface of the plate and facing each other endwise, each having diagonal end surfaces in edgewise relatively overlapping relationship each extending past the other, thereby providing respective sides of true V notches adjacent the both sides of the plate for engagement with the straddling knife edge member.

3. A measuring beam for an instrument of the class described, comprising a plate, one side of which is finished for engagement with a pivot member, such as a knife edge, and a pair of separate members which are channeled to straddle the plate, mounted on opposite end portions of the opposite side of the plate, each member having a diagonal end surface at each edge of the plate, said end surfaces at each edge extending past each other in relatively intersecting relationship to form true V-notches at both edges of the plate for receiving paired knife edges adapted to form another pivot.

GEORGE D. WEBBER.